US009231461B2

(12) United States Patent
Kim et al.

(10) Patent No.: US 9,231,461 B2
(45) Date of Patent: Jan. 5, 2016

(54) ELECTROMAGNETIC ENERGY CONVERSION THROUGH COIL AND MAGNET ARRAYS

(71) Applicant: University of Southern California, Los Angeles, CA (US)

(72) Inventors: Eun Sok Kim, Rancho Palos Verdes, CA (US); Qian Zhang, Los Angeles, CA (US)

(73) Assignee: University of Southern California, Los Angeles, CA (US)

( * ) Notice: Subject to any disclaimer, the term of this patent is extended or adjusted under 35 U.S.C. 154(b) by 244 days.

(21) Appl. No.: 13/911,959

(22) Filed: Jun. 6, 2013

(65) Prior Publication Data

US 2013/0334903 A1 Dec. 19, 2013

Related U.S. Application Data

(60) Provisional application No. 61/659,356, filed on Jun. 13, 2012.

(51) Int. Cl.
*H02K 35/00* (2006.01)
*H02K 35/02* (2006.01)
*H02K 35/04* (2006.01)

(52) U.S. Cl.
CPC ............... *H02K 35/00* (2013.01); *H02K 35/02* (2013.01); *H02K 35/04* (2013.01)

(58) Field of Classification Search
CPC ........ H02K 35/00; H02K 35/02; H02K 35/04
USPC ..................... 310/12.01–12.33, 28
See application file for complete search history.

(56) References Cited

U.S. PATENT DOCUMENTS 7,218,017 B1 * 5/2007 Chitayat et al. ............ 310/12.19
7,443,046 B2 10/2008 Stewart et al.
(Continued)

FOREIGN PATENT DOCUMENTS

WO WO2006127500 A3 3/2007
WO WO2007121380 A2 10/2007
(Continued)

OTHER PUBLICATIONS

Jiang et al., "Fabrication of a vibration-driven electromagnetic energy harvester with integrated NdFeB/Ta multilayered micro-magnets", Journal of Micromechanics & Microengineering, Institute of Physics Publishing, vol. 21, No. 9, Aug. 10, 2011, pp. 1-6.
(Continued)

*Primary Examiner* — Hanh Nguyen
(74) *Attorney, Agent, or Firm* — Fish & Richardson P.C.

(57) ABSTRACT

This specification describes technologies relating to converting vibration energy to electrical energy through electromagnetic transduction. According to an aspect, an apparatus to convert kinetic energy to electricity through electromagnetic transduction can include: an array of magnets arranged in a first plane; and an array of coils arranged in a second plane with respect to the first plane to form a gap between the array of magnets and the array of coils. According to another aspect, an energy harvester can include: a two dimensional array of magnets; a two dimensional array of coils; a housing configured and arranged to limit a direction of motion of either the two dimensional array of magnets or the two dimensional array of coils; and additional magnets configured and arranged to form a suspension system for either the two dimensional array of magnets or the two dimensional array of coils in the direction of motion.

18 Claims, 8 Drawing Sheets

(56) References Cited

U.S. PATENT DOCUMENTS

| | | | |
|---|---|---|---|
| 8,067,849 B2 | 11/2011 | Stewart | |
| 2007/0052302 A1* | 3/2007 | Cheung et al. | 310/12 |
| 2009/0146508 A1 | 6/2009 | Peng | |
| 2010/0187835 A1* | 7/2010 | Hohlfeld et al. | 290/1 R |
| 2012/0091847 A1 | 4/2012 | Fullerton | |
| 2013/0088099 A1* | 4/2013 | Aoyama et al. | 310/12.12 |

FOREIGN PATENT DOCUMENTS

| | | |
|---|---|---|
| WO | WO2009003915 A1 | 1/2009 |
| WO | WO2011051800 A1 | 5/2011 |

OTHER PUBLICATIONS

Foisal et al., "Multi-frequency electromagnetic energy harvester using a magnetic spring cantilever", Sensors and Actuators A: Physical, Elsevier Sequoia S.A., vol. 182, May 7, 2012, pp. 106-113.

Sari et al., "An electromagnetic micro energy harvester based on an array of parylene cantilevers", Journal of Micromechanics & Microengineering, Institute of Physics Publishing, vol. 19, No. 10, Oct. 1, 2009, pp. 1-13.

Authorized Officer Susanne Gundlach, Notification of Transmittal of the International Search Report and the Written Opinion of the International Searching Authority, International Application No. PCT/US2013/044580, mailed Jun. 23, 2014, 14 pages.

"Floating "Power Buoy" Creates Electricity from Ocean Waves", SciTech Daily, http://scitechdaily.com/floating-power-buoy-creates-electricity-from-ocean-waves, May 14, 2012 by Staff, downloaded May 8, 2013, 6 pages.

"The Pelamis Wave Energy Converter", Wikipedia, http://en.wikipedia.org/wiki/Pelamis_Wave_Energy_Converter, downloaded May 8, 2013, 5 pages.

Galchev, T.V. et al., "Harvesting traffic-induced vibrations for structural health monitoring of bridges", Journal of Micromechanics and Microengineering, 21 (2011) 104005, Sep. 29, 2011, pp. 1-13.

Raunekk, "Wave power: Archimedes Wave Swing Machines", http://www.brighthub.com/environrnent/renewable-energy/articles/40548.aspx, Jun. 29, 2009, downloaded May 8, 2013, 3 pages.

Saha, C.R. et al., "Electromagnetic generator for harvesting energy from human motion", Sensors and Actuators A 147 (2008) pp. 248-253.

Zhang, Qian et al., "Energy Harvesters with High Electromagnetic Conversion Efficiency through Magnet and Coil Arrays", MEMS 2013, Jan. 2013, pp. 110-113.

Zhu et al., "Vibration energy harvesting using the Halbach array", Smart Materials and Structures, 21 (2012) 075020, Jun. 14, 2012, pp. 1-11.

* cited by examiner

ELECTROMAGNETIC ENERGY CONVERSION THROUGH COIL AND MAGNET ARRAYS

CROSS-REFERENCE TO RELATED APPLICATIONS

This application claims the benefit under 35 U.S.C. §119 (e) of U.S. Patent Application No. 61/659,356, filed Jun. 13, 2012, and entitled "Electromagnetic Energy Conversion through Coil and Magnet Arrays".

STATEMENT AS TO FEDERALLY SPONSORED RESEARCH

This invention was made with government support under Grant No. ECS 0824271 awarded by the National Science Foundation (NSF). The government has certain rights in the invention.

BACKGROUND

This specification relates to converting vibration energy to electrical energy through electromagnetic transduction.

There are plenty of places and objects that vibrate and provide sources for energy harvesting, such as ocean, bridges, building walls, automobiles, airplanes, ships, etc. Even humans, animals, or any moving objects carry quite a bit of vibration energy. Harvesting such ubiquitous energy offers alternative energy means. But the conversion efficiency from mechanical to electrical energy for vibration-energy harvesters has been at such a level that a power generation beyond Watt with a single harvester has been considered impractical.

SUMMARY

This specification describes technologies relating to converting vibration energy to electrical energy through electromagnetic transduction.

In general, one or more aspects of the subject matter described in this specification can be embodied in an apparatus to convert kinetic energy to electricity through electromagnetic transduction, where the apparatus includes: an array of magnets arranged in a first plane; and an array of coils arranged in a second plane with respect to the first plane to form a gap between the array of magnets and the array of coils. Other embodiments can include corresponding systems and methods.

In some implementations, each magnet in the array of magnets can be 1-100 mm×1-100 mm×1-10 mm, each of the coils in the array of coils can be 1-100 mm in diameter, and the gap can be an air gap of 0.25 mm. The array of magnets and the array of coils can be configured and arranged to maximize magnetic flux change as either array moves relative to the other array in an in-plane direction in response to environmental vibration. The array of magnets can be arranged such that north and south poles of the magnets alternate to create a magnetic field distribution with steep field gradient. The amplitude of motion of either array in an in-plane direction relative to the other array can be limited based on a size of the magnets as arranged in relation to the coils. The size of the magnets as arranged in relation to the coils can be selected based on expected motion in a target environment. Moreover, the size of each of the magnets in the vibration direction can be a half of an expected maximum vibration amplitude.

The optimum amplitude of motion of either array in an in-plane direction relative to the other array can be limited based on a size of the magnets as arranged in relation to the coils. The amplitude of motion of either array in an in-plane direction relative to the other array can be limited based on a size of the whole magnet array as arranged in relation to the coil array. The apparatus can include a mechanism to restrict motion transverse to the first and second planes and to limit motion in an in-plane direction within set boundaries. This mechanism can include a metal, silicon, silicon oxide, silicon nitride, hard plastic, or elastomer plate coupled with either the array of magnets or the array of coils to act as a cantilever for the attached array. For example, the mechanism can be a silicone rubber plate.

According to another aspect, a planar electromagnetic transducer to convert electrical energy to kinetic energy can include: an array of magnets arranged in a first plane; and an array of coils arranged in a second plane with respect to the first plane to form a gap between the array of magnets and the array of coils. In the planar electromagnetic transducer, each magnet in the array of magnets can be 1-100 mm×1-100 mm×1-10 mm, each of the coils in the array of coils can be 1-100 mm in diameter, and the gap can be an air gap of 0.25 mm. The array of magnets and the array of coils can be configured and arranged to maximize magnetic flux change as either array moves relative to the other array in an in-plane direction. The array of magnets can be arranged such that north and south poles of the magnets alternate to create a magnetic field distribution with steep field gradient. The amplitude of motion of either array in an in-plane direction relative to the other array can be limited based on a size of the magnets as arranged in relation to the coils.

The size of the magnets as arranged in relation to the coils can be selected based on a target application. The planar electromagnetic transducer can include a mechanism to restrict motion transverse to the first and second planes and to limit motion in an in-plane direction within set boundaries. This mechanism can include a metal, silicon, silicon oxide, silicon nitride, hard plastic, or elastomer plate coupled with either the array of magnets or the array of coils to act as a cantilever for the attached array. For example, the mechanism can include a silicone rubber plate in the planar electromagnetic transducer.

One or more additional aspects of the subject matter described in this specification can be embodied in an energy harvester that includes: a two dimensional array of magnets; a two dimensional array of coils; a housing configured and arranged to limit a direction of motion of either the two dimensional array of magnets or the two dimensional array of coils; and additional magnets configured and arranged to form a suspension system for either the two dimensional array of magnets or the two dimensional array of coils in the direction of motion. Other embodiments can include corresponding systems and methods.

The two dimensional array of coils can be a first two dimensional array of coils, the harvester can include a second two dimensional array of coils, the first and second arrays of coils can be coupled with housing, the two dimensional array of magnets can be arranged to move in the direction of motion, and at least one of the additional magnets can be coupled with the two dimensional array of magnets, while at least another of the additional magnets can be placed to levitate the at least one of the additional magnets and the two dimensional array of magnets coupled therewith. The at least one of the additional magnets can be coupled with the two dimensional array of magnets via a spacer section. The housing and the spacer section can include plastic. Further, the at least another of the additional magnets can be solidly mounted on the housing.

The two dimensional array of magnets can include N×M magnets having north and south poles alternating in a checkerboard pattern, and the two dimensional array of coils can include N×(M−1) coils arranged such that each of the coils is centered over a boundary between a north magnet and a south magnet of the array of magnets when the harvester is in a resting position. The housing can be configured and arranged to limit the direction of motion of the two dimensional array of magnets to a single dimension. The energy harvester can use a value of M selected from 2-15, inclusive (e.g., 5). Further, the energy harvester of can use a value of N selected from 2-15, inclusive (e.g., 2).

Particular embodiments of the subject matter described in this specification can be implemented to realize one or more of the following advantages. The newly invented electromagnetic energy conversion technique allows efficient electrical power generation from a vibrating surface with its vibrating amplitude anywhere from micron to tens of cm. The mechanical-to-electrical energy conversion efficiency can be improved so much by the invented idea that it can be used to harvest mW power level from vibrating surface of micron-level amplitude, or MW-GW power level from ocean wave, when the proposed energy harvester is scaled up. For example, the energy conversion system can be scaled up and mounted on ocean-based structures, bridges, building walls, etc. The invented idea is to integrate an array of magnets (arranged on a planar surface) and another array of coils (arranged in a manner similar to the way the magnets are arrayed) with an air gap between the two arrays, and to allow either the magnet array or the coil array to vibrate with respect to the other along the planar surface in response to applied vibration energy. In some implementations, incredible mechanical-to-electrical energy conversion efficiency is achievable with electromagnetic energy harvesters constructed in accordance with the systems and techniques described herein. In addition, improved suspension systems can increase the effectiveness of energy harvesters constructed in accordance with the systems and techniques described herein.

The details of one or more embodiments of the subject matter described in this specification are set forth in the accompanying drawings and the description below. Other features, aspects, and advantages of the invention will become apparent from the description, the drawings, and the claims.

DETAILED DESCRIPTION

Figure 1B:
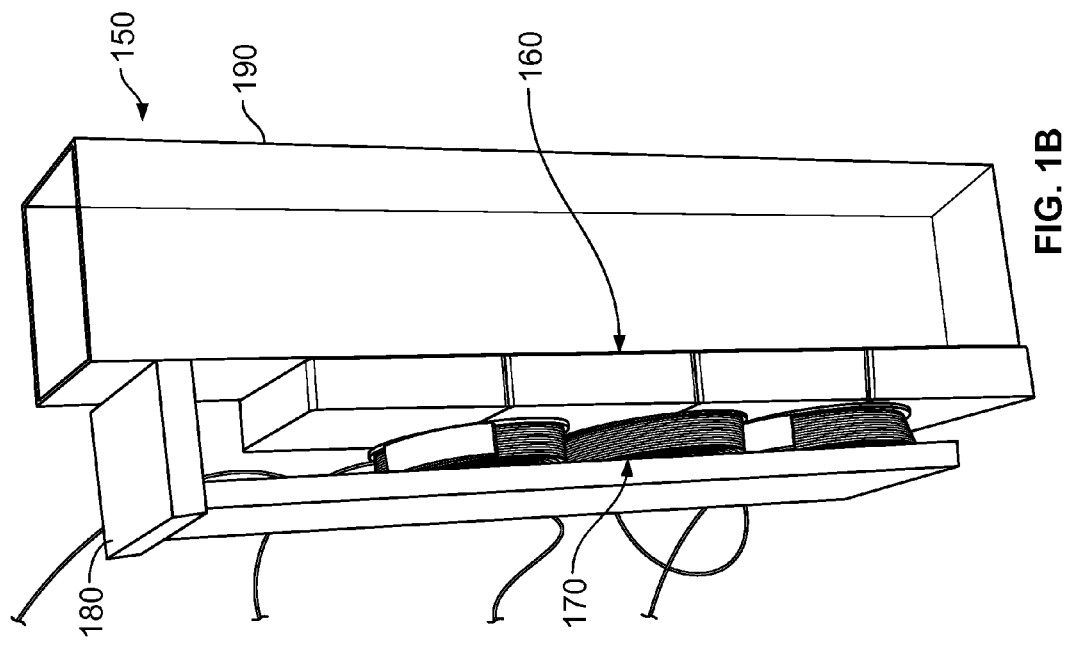
FIG. 1B shows an electromagnetic energy harvester having a size of 13 mm×18 mm×57 mm, a mass of 30.8 grams, and built with three 8Ω coils (200 turns, OD: 12.7 mm, ID: 3.5 mm, H: 1.5 mm) and four 12.7 mm×12.7 mm×3.2 mm magnets.
Figure 1A:
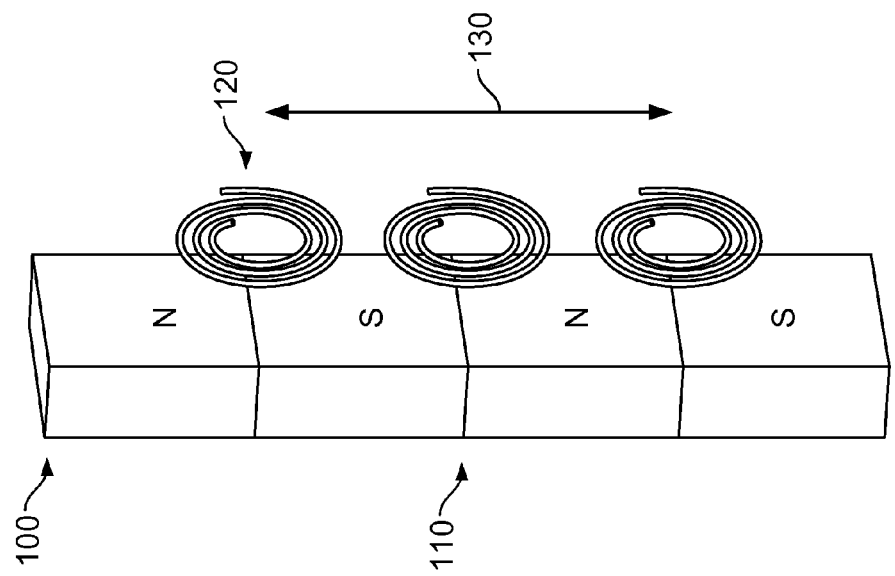
FIG. 1A shows a generalized representation of an electromagnetic energy harvester with four magnets and three coils.

FIG. 1A shows a generalized representation of an electromagnetic energy harvester 100. An array 110 of magnets (4 in this case) is arranged on a planar surface such that north and south poles alternate, in order to create a magnetic field distribution with steep field gradient. And over boundaries between the magnets is placed an array 120 of coils (3 in this case), as illustrated in FIG. 1A. Near the boundaries between the adjacent magnets, the magnetic field gradient is high, and produces a high mechanical-to-electrical energy conversion efficiency as the coils vibrate 130 in the direction parallel to the planar surface.

A key concept in this design is in how the mechanical vibration/motion is converted into electrical energy through electromagnetic transduction. Unlike the conventional approach of using a magnet and a coil, the invented idea employs a large number of small magnets (e.g., 12.7 mm×12.7 mm×3.2 mm) (arrayed over a planar area) along with a similarly large number of coils (e.g., 12.7 mm outer diameter) placed over the magnet array (e.g., with an air gap of 0.25 mm between the two arrays). This particular idea is to maximize the magnetic flux change as the coil or magnet array moves in response to the environmental vibration, and has allowed us to obtain 10.2 mW from a 6 g vibration at around 75 Hz, i.e., a vibration amplitude of only about 265 microns, with an energy harvester of 13 mm×18 mm×57 mm (=13 cc), weighing 30.8 grams.

FIG. 1B shows an electromagnetic energy harvester 150 having a size of 13 mm×18 mm×57 mm and a mass of 30.8 grams. The electromagnetic energy harvester 150 was built using a pedestal 190 to which four 12.7 mm×12.7 mm×3.2 mm magnets 160 are attached, and a cantilever 180 from which three 8Ω coils 170 (200 turns, OD: 12.7 mm, ID: 3.5 mm, H: 1.5 mm) are suspended. The cantilever 180 in this implementation is a silicone rubber plate used to suspend the coil array, and which vibrates as a cantilever when the coil array moves in response to external vibration. A silicone rubber is chosen due to its large ultimate tensile strength and low stiffness constant (i.e., Young's modulus). Other materials with low Young's modulus, such as other elastomers (e.g., Teflon) or soft plastic, can also be used for the cantilever function for applications where the vibration frequency is less than a few hundred Hz. For applications where the frequency is greater than a few hundred Hz, metals (such as aluminum, copper, steel), silicon, silicon dioxide (or glass), silicon nitride, or hard plastic can be used as the cantilever.

The magnets 160 in this implementation are square magnets assembled together as an array to provide high magnetic flux gradient. Instead of square magnets, rectangular or round magnets (or other shaped magnets) can also be arranged with alternating north and south orientation for increasing the magnetic flux change. The lateral dimension of a single magnet in the magnet array will determine the maximum vibration amplitude up to which the energy conversion efficiency remains high. The maximum vibration amplitude is expected to be about two times the lateral dimension of the magnet along the vibration direction. For example, if the magnet array is formed with four 1×2 mm² rectangular magnets such that the total length along the direction of the vibration is 4 mm, then the maximum vibration amplitude is 2 mm (=2×1 mm). However, the harvested energy continues to increase as long as the vibration amplitude remains within the lateral dimension of the magnet array.

Figure 2A:
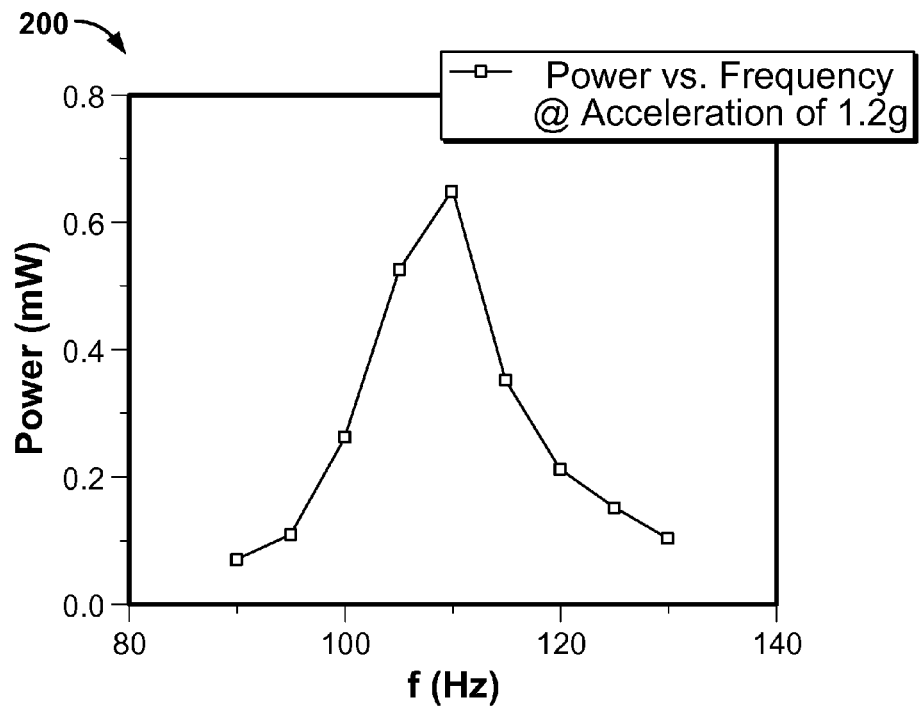
FIG. 2A shows a graph of measured power output (into 24Ω load) vs. frequency for 1.2 g acceleration for the electromagnetic energy harvester of FIG. 1B.
Figure 2B:
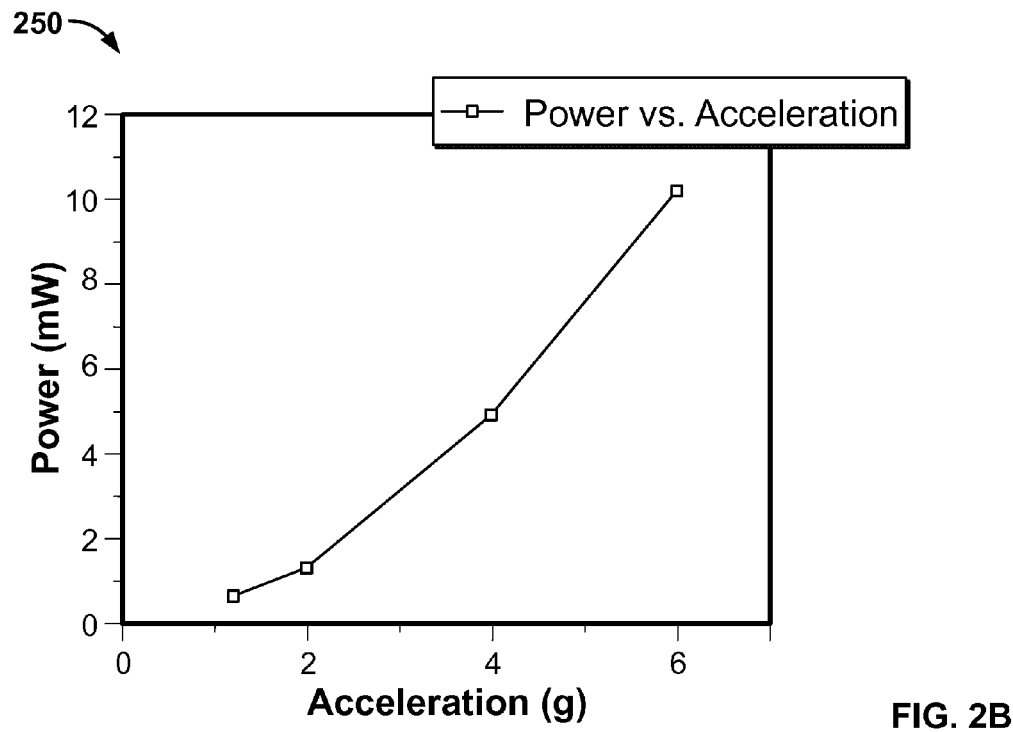
FIG. 2B shows a graph of measured power output (into 24Ω load) vs. acceleration (0.65 mW for 1.2 g @110 Hz, 1.3 mW for 2 g @90 Hz, 4.9 mW for 4 g @85 Hz, 10.2 mW for 6 g @75 Hz) for the electromagnetic energy harvester of FIG. 1B.

The electromagnetic energy harvester 150 produced 10 mW, from a mere 6 g vibration at about 75 Hz (vibration amplitude of about 265 μm). FIGS. 2A and 2B show the measured performance of the energy harvester shown in FIG. 1B. FIG. 2A shows a graph 200 of measured power output (into 24Ω load) vs. frequency for 1.2 g acceleration for the electromagnetic energy harvester of FIG. 1B. FIG. 2B shows a graph 250 of measured power output (into 24Ω load) vs. acceleration (0.65 mW for 1.2 g @110 Hz, 1.3 mW for 2 g @90 Hz, 4.9 mW for 4 g @85 Hz, 10.2 mW for 6 g @75 Hz) for the electromagnetic energy harvester of FIG. 1B. As the volume and weight of the harvester 150 are 13 cc and 30.8 grams, respectively, the harvester 150 represents several hundred times improvement over another harvester that produced 0.2 mW from a vibration amplitude of about 625 μm (at 20 Hz) with an electromagnetic energy harvester having an internal volume of 43 cc (see T. V. Galchev, J. McCullagh, R. L. Peterson and K. Najafi, "Harvesting traffic-induced vibrations for structural health monitoring of bridges," J. Micromech. Microeng. 21 (October 2011) 104005).

Figure 3A:
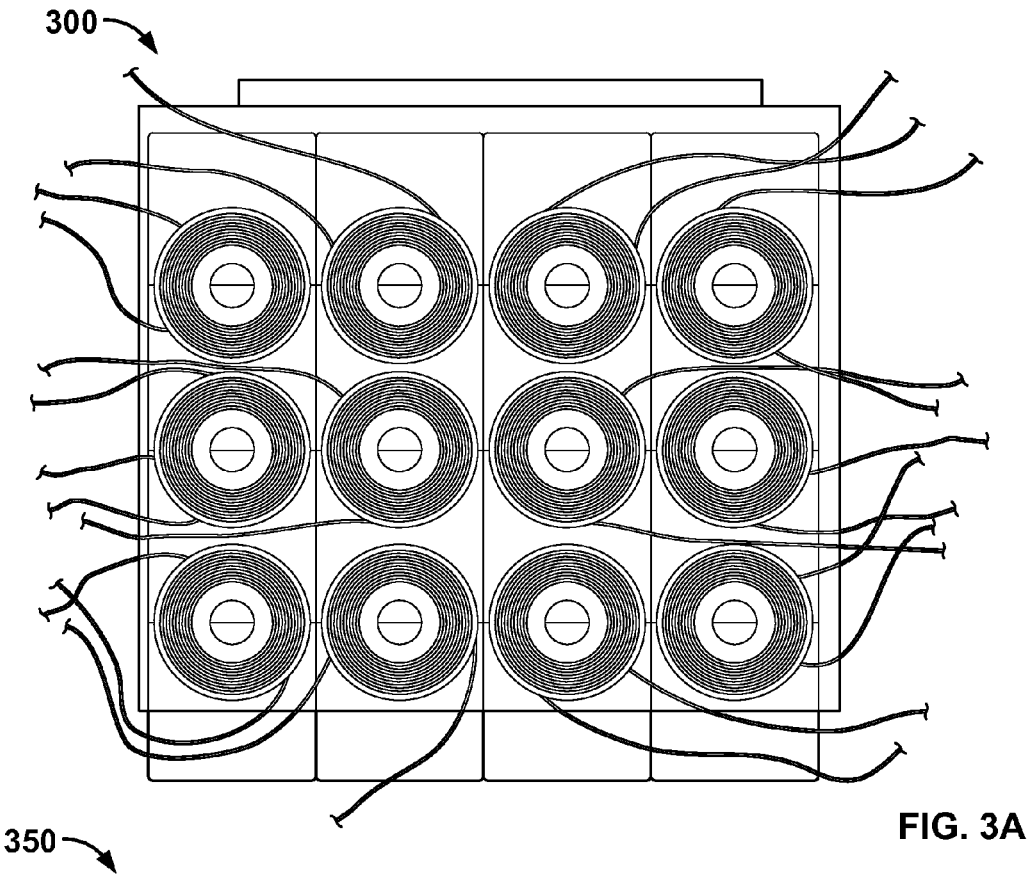
FIG. 3A shows an electromagnetic power harvester made from an array of electromagnetic vibration-energy harvesters.
Figure 3B:
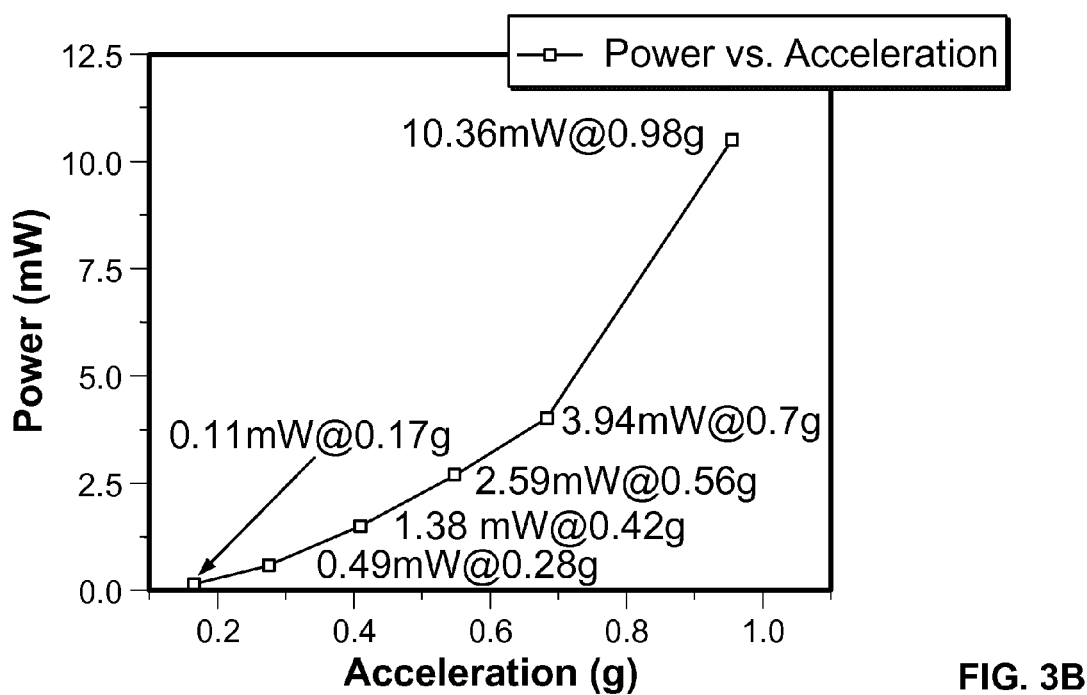
FIG. 3B shows a graph of measured power vs. applied acceleration for the electromagnetic power harvester of FIG. 3A.

The harvester 150 used 4 magnets and 3 coils. When the harvester 150 was scaled up to 16 magnets and 12 coils, while keeping the spring constant about the same, the fundamental resonant frequency of the harvester dropped to 40 Hz (due to the mass increase), and 10.4 mW was obtained from a 1 g vibration at 40 Hz. FIG. 3A is a front-view of an electromagnetic power harvester 300 made from an array of electromagnetic vibration-energy harvesters. FIG. 3B shows a graph 350 of measured power vs. applied acceleration for the electromagnetic power harvester of FIG. 3A. As noted, scaling the harvester from 3 coils to 12 coils caused the fundamental resonant frequency of the harvester to drop to 40 Hz due to the increased mass. With the reduced resonant frequency, the power generation when the 12 coils were connected in series was increased to 10 mW for 1 g vibration at about 40 Hz.

The general principals underlying the two example harvesters 150 and 300 can be scaled up to generate massive power (i.e., MW-GW level). For example, some implementations can include a scaled up harvester that generates power from ocean waves whose vibration frequency is about 1 Hz. Considering the same spring system (i.e., same spring constant k), the resonant frequency is $\omega=\sqrt{k/m}$, where m is the mass of the coils. If k is kept constant, a resonant frequency of 1 Hz can be obtained with 12×40² coils, since 40 Hz resonant frequency was obtained with 12 coils. The increase in the coil number should translate directly into an increase in the power output by a factor of 1,600. Moreover, the electromotive force (emf) from a sinusoidally vibrating surface with vibration amplitude of $Y_o$ and radial frequency of $\omega$ is $$e_{emf\,max} = j\omega Y_o \frac{(\omega/\omega_n)^2}{1+2j\zeta\omega/\omega_n-(\omega/\omega_n)^2}NS\frac{dB}{dz} = jA\frac{\omega/\omega_n^2}{1+2j\zeta\omega/\omega_n-(\omega/\omega_n)^2}NS\frac{dB}{dz}$$

where A=acceleration amplitude=$\omega^2 Y_0$. At the resonant frequency (i.e., $\omega=\omega_n$), $$e_{emf\,max} = j\frac{A}{\omega_n}\frac{1}{2j\zeta}NS\frac{dB}{dz},$$

and the power output which is proportional to $e_{emfmax}^2$ is proportional $(1/\omega_n)^2$ for a given acceleration A.

Thus, if the harvester is scaled up to reduce its resonant frequency to 1 Hz (from 40 Hz) by increasing the coil number without changing the spring constant, the expected power is 10 mW×40²×40²=25.6 kW for 1 g acceleration at 1 Hz (corresponding to a vibration amplitude of 0.25 m). In other words, an ocean wave having 0.25 meter amplitude at about 1 Hz (corresponding to 1 g acceleration) can be converted into 25.6 kW by the harvester occupying 1.8 m×1.8 m×18 mm volume and touching 1.8 m×18 mm ocean area. If the wave amplitude is 2.5 mm, rather than 250 mm, then the power output would be 2.56 W, which will increase to 256 W, if 100 of the harvesters are connected. This means that 256 W can be generated out of 1.8 m×1.8 m ocean surface with wave amplitude of 2.5 mm.

Therefore, a generation of GW power level from ocean wave action is a possibility with the proposed electromagnetic energy transduction that can potentially allow 0.78 generation of MW per square meter of ocean surface from an ocean wave vibrating at 1 Hz with amplitude of 25 cm. In an extremely worst case scenario of the wave amplitude being only 2.5 mm, the newly invented mechanical-to-electrical energy conversion technique still offers 78 W/m². Since the invented idea is basically to increase the mechanical-to-electrical energy conversion efficiency, it can readily be used in many of the existing ocean energy technologies such as the Power Buoy, Pelamis, Archimedes Wave Swing, etc. In this case, a multi-magnet, multi-coil array with a proper suspension system will replace an existing single-coil, single-magnet, for several hundred times improvement on the mechanical-to-electrical energy conversion efficiency.

Figure 4A:
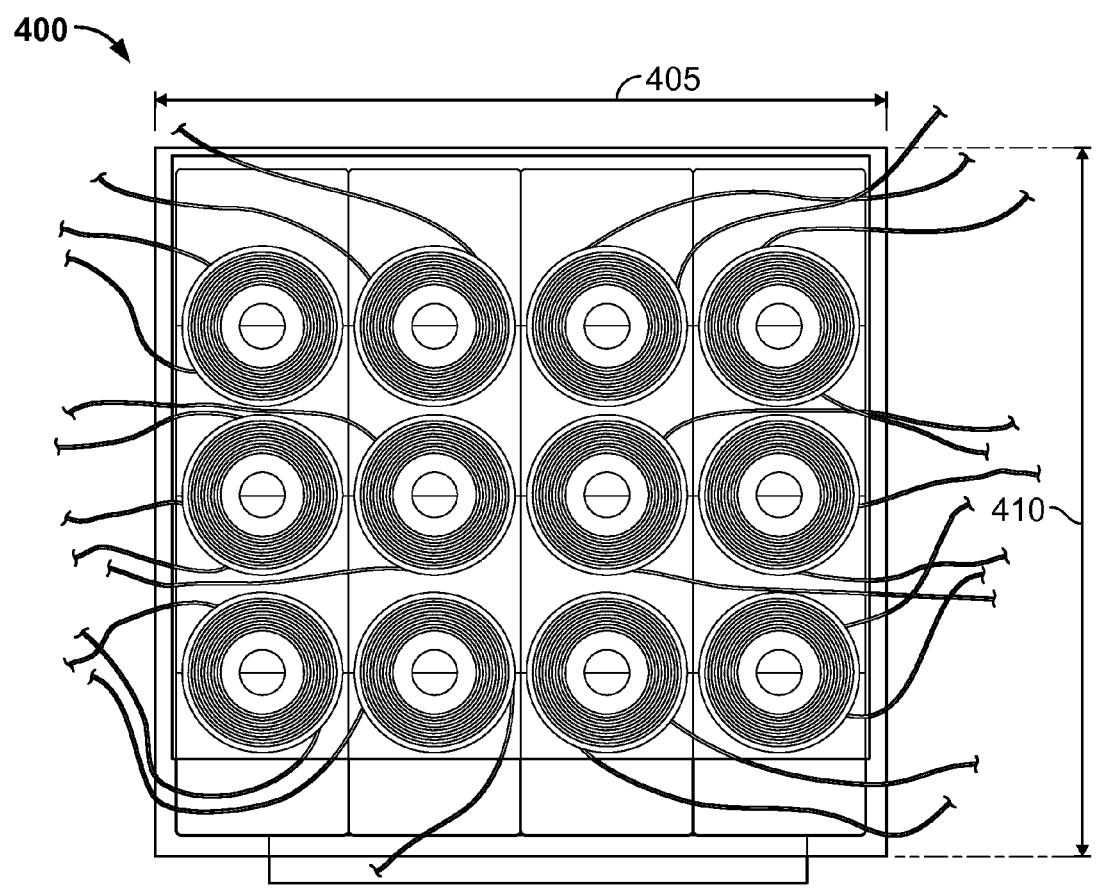
FIG. 4A shows another electromagnetic power harvester made from an array of electromagnetic vibration-energy harvesters.

FIG. 4A shows another electromagnetic power harvester 400 made from an array of electromagnetic vibration-energy harvesters. The macroscale energy harvester 400 has been scaled up to 16 magnets and 12 coils occupying 26 cc and weighing 90 gram. The harvester 400 has length 405 of 51 mm and a height 410 of 51 mm. The plastic plate containing the 12 coils and the 16-magnet array are mechanically connected by two 250 μm-thick plastic cantilevers at the top and the bottom.

Figure 4B:
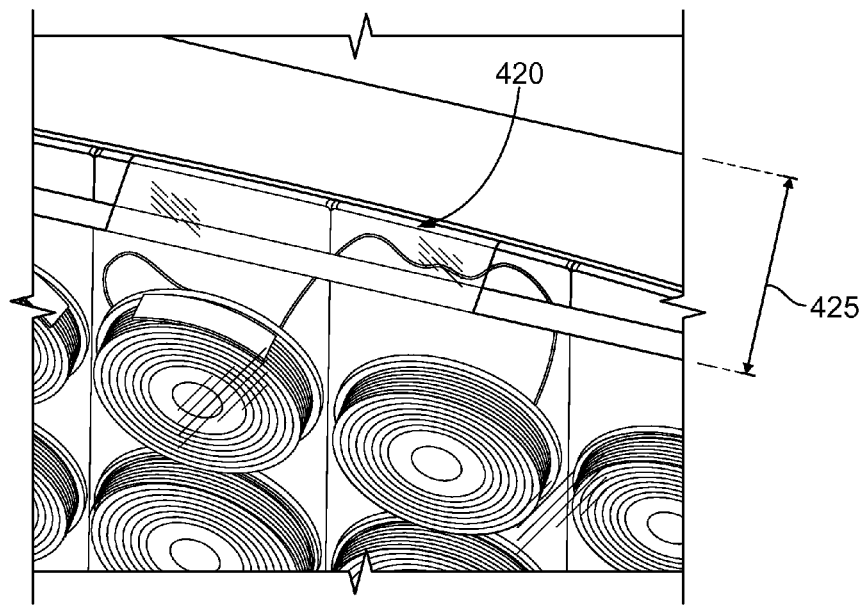
FIG. 4B shows a portion of the electromagnetic power harvester from FIG. 4A.

FIG. 4B shows a portion of the electromagnetic power harvester from FIG. 4A. The harvester has a width 425 of 10 mm. As shown, a plastic cantilever 420 at the top of the harvester connects the coil array with the magnet array. The two cantilevers at both top and bottom, rather than just one cantilever, are used to make the vibration direction of the proof mass (the magnet array) more parallel to the coil plate so that the energy lost by the hitting of magnets and coils is reduced. The thin plastic film also provides a low spring constant as well as a sturdy support for a relatively heavy magnet-proof-mass, and facilitates a low resonant frequency, making the energy harvesters work at a wide frequency range of input acceleration.

Figure 4C:
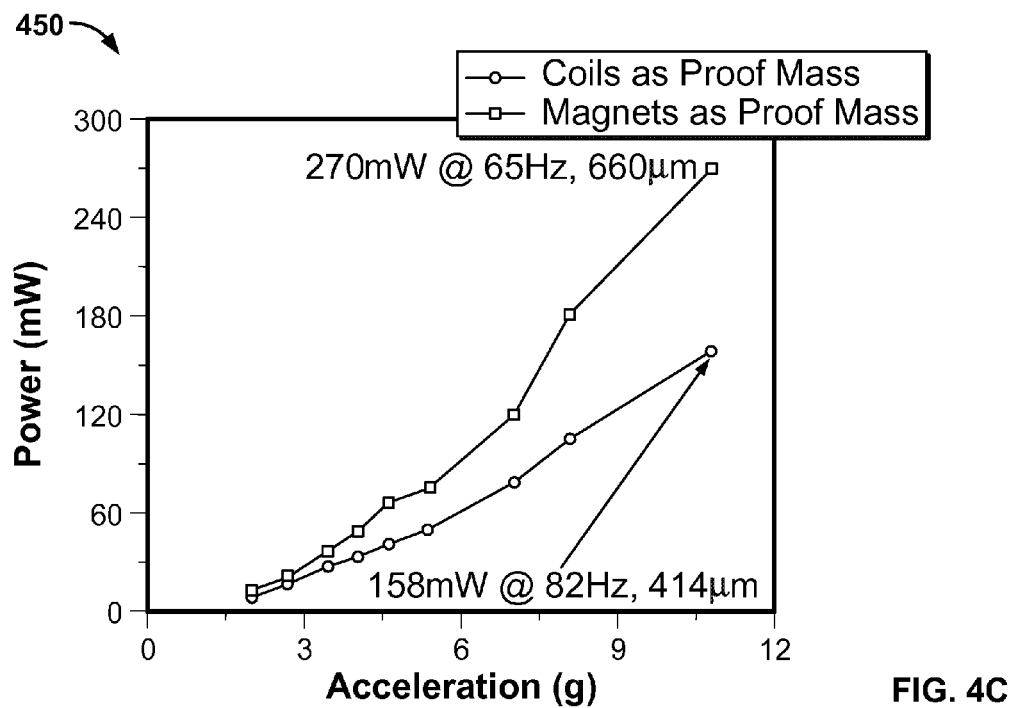
FIG. 4C shows a graph of measured power output versus input acceleration for alternate versions of the electromagnetic power harvester of FIG. 4A.

FIG. 4C shows a graph 450 of measured power output (into 96Ω load) versus input acceleration for alternate versions of the electromagnetic power harvester of FIG. 4A. When the 12 coils are connected in series, the energy harvester with the magnets acting as the proof mass generates 270 mW for 11.2 g acceleration at the resonant frequency of 65 Hz (vibration amplitude of 660 μm), as shown in FIG. 4C, which also shows the performance of the energy harvester with the coils as the proof mass.

Figure 5B:
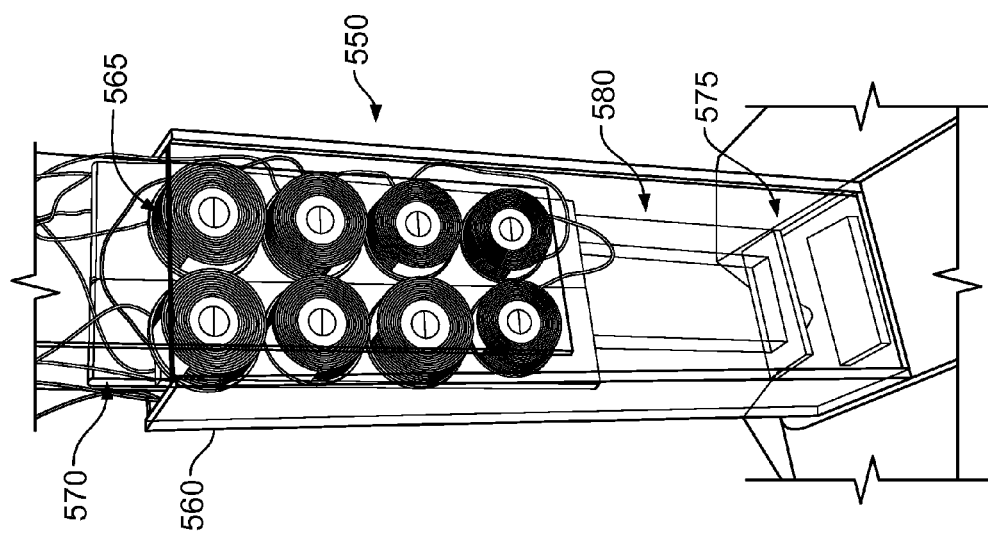
FIG. 5B shows an implementation of the generalized electromagnetic energy harvester from FIG. 5A with ten permanent magnets in the magnet array and eight coils in each coil array on either side of the magnet array.
Figure 5A:
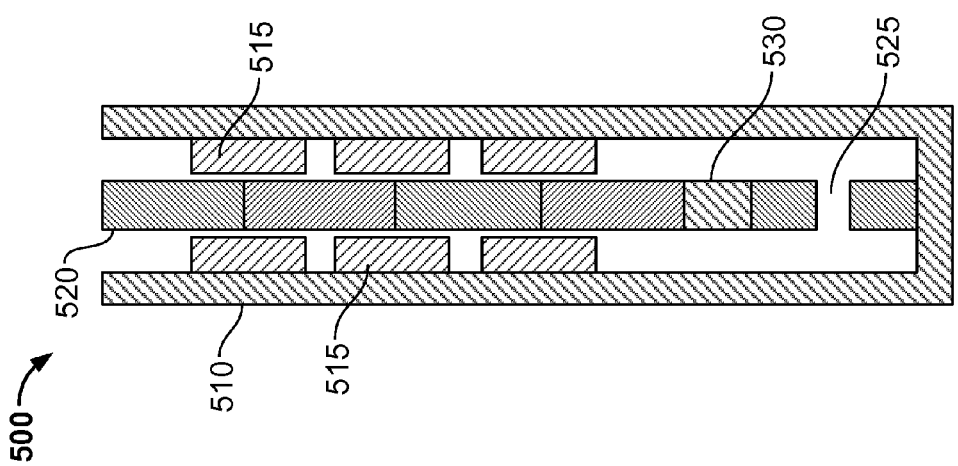
FIG. 5A shows a generalized representation of an electromagnetic energy harvester with a magnet array and coil arrays on either side of the magnet array that is suspended by magnetic spring or levitation.

FIG. 5A shows a generalized representation of an electromagnetic energy harvester 500 with a magnet array and coil arrays on either side of the magnet array that is suspended by magnetic spring (i.e., magnetic levitation). The harvester 500 includes a housing 510 that has coil arrays 515 attached to the inside thereof. Between the coil arrays 515 is a magnet array 520, which can be restricted to vertical movement by the housing 510. The harvester 500 shows only four permanent magnets in the magnet array 520, and three coils in each coil array 515. However, many different numbers of magnets and coils can be used in various implementations.

The housing 510 can be made of various materials (e.g., plastic) and can be a cylinder (or other shape) that includes a magnetic spring/suspension mechanism for the energy harvester. Either the coil array(s) or the magnet arrays(s) can be suspended by a magnetic spring 525 (in various implementations) for a resonant frequency of several Hz. As the vibration energy harvester produces a maximum power at its resonant frequency, electromagnetic energy harvesters, whose resonant frequency is tens or hundreds of hertz, are ineffective in harvesting vibration energy at less than 10 Hz. Thus, it is highly desirable to make the harvester's resonant frequency less than 10 Hz, where many commonly available vibrations such as human body motion, bridge vibration, aircraft wing vibration, ocean wave, etc. are occurring.

In the example arrangement shown in FIG. 5A, two magnets are arranged to face each other with the same pole in order to form a spring system 525 that suspends the magnet-array proof mass. Another set of two magnets can also be added at the top of the magnet-array proof mass to form a magnetic spring in consort with the two magnets at the bottom. This can also be done when a coil-array is used as a proof mass. The magnet array is levitated due to the repulsive force in the magnetic spring system, and vibrates in response to external vibration, making the coil array generate electricity. The energy harvester 500 can also include a spacer section 530 between the bottom of the magnet array 520 and the magnetic suspension 525. Various implementations of the general design can be made to build a power generator with magnet and coil arrays to harvest energy from vibration at less than 10 Hz.

FIG. 5B shows an implementation 550 of the generalized electromagnetic energy harvester from FIG. 5A with ten permanent magnets in the magnet array 570 and eight coils in each coil array 565 on either side of the magnet array 570. The energy harvester 550 has dimensions of 10 mm×26 mm×100 mm (26 cc), has 98 gram mass, and is built with sixteen 6.8Ω coils (200 turns, OD: 12 mm, ID: 3 mm, H: 1.5 mm) and ten 12.7 mm×12.7 mm×3.2 mm magnets. The energy harvester 550 includes a plastic spacer section 580 and a magnetic suspension 575 (for example, with two 19 mm×9.5 mm×1.6 mm magnets) within a plastic housing 560. Instead of rectangular magnets, square or round magnets (or other shaped magnets) can also be used for the magnetic suspension.

Figure 6A:
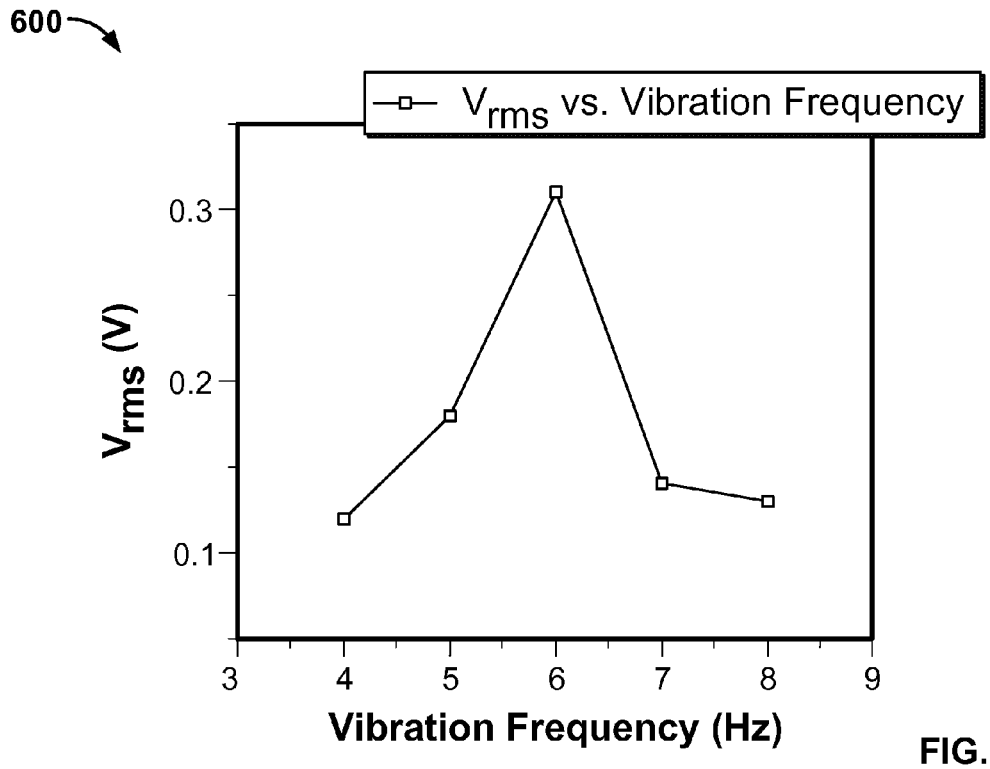
FIG. 6A shows a graph of measured voltage output (root-mean-square value) vs. vibration frequency for 0.1 g acceleration for the energy harvester from FIG. 5B.
Figure 6B:
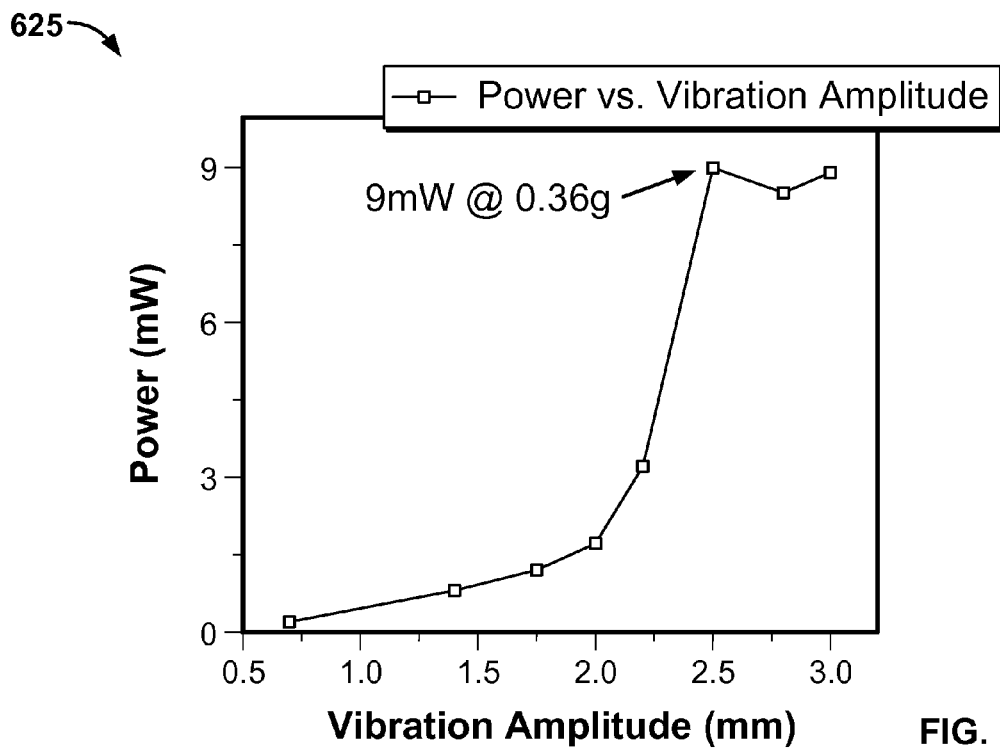
FIG. 6B shows a graph of measured power output (into 108Ω load) vs. vibration amplitude at 6 Hz for the energy harvester from FIG. 5B.

FIG. 6A shows a graph 600 of measured voltage output root mean square (RMS) value vs. vibration frequency for 0.1 g acceleration for the energy harvester from FIG. 5B. The energy harvester 550 generates an emf of 0.31V. (root mean square value) from the acceleration of 0.1 g at 6 Hz (vibration amplitude of about 0.7 mm), as shown. FIG. 6B shows a graph 625 of measured power output (into 108Ω load) as a function of vibration amplitude at 6 Hz for the energy harvester from FIG. 5B. As the vibration amplitude is increased from 0.7 to 2.5 mm, the power output delivered to a 108Ω load by the energy harvester increases, and reaches a peak value of 9 mW for 0.36 g acceleration. This peak power output is kept with vibration amplitude from 2.5 to 3 mm due to the maximum displacement limited by the gap between the two magnets used for the magnetic spring 575. The maximum displacement can be adjusted by the two magnets and the suspended magnet array, which determine the spring constant and the proof mass, respectively.

Figure 6C:
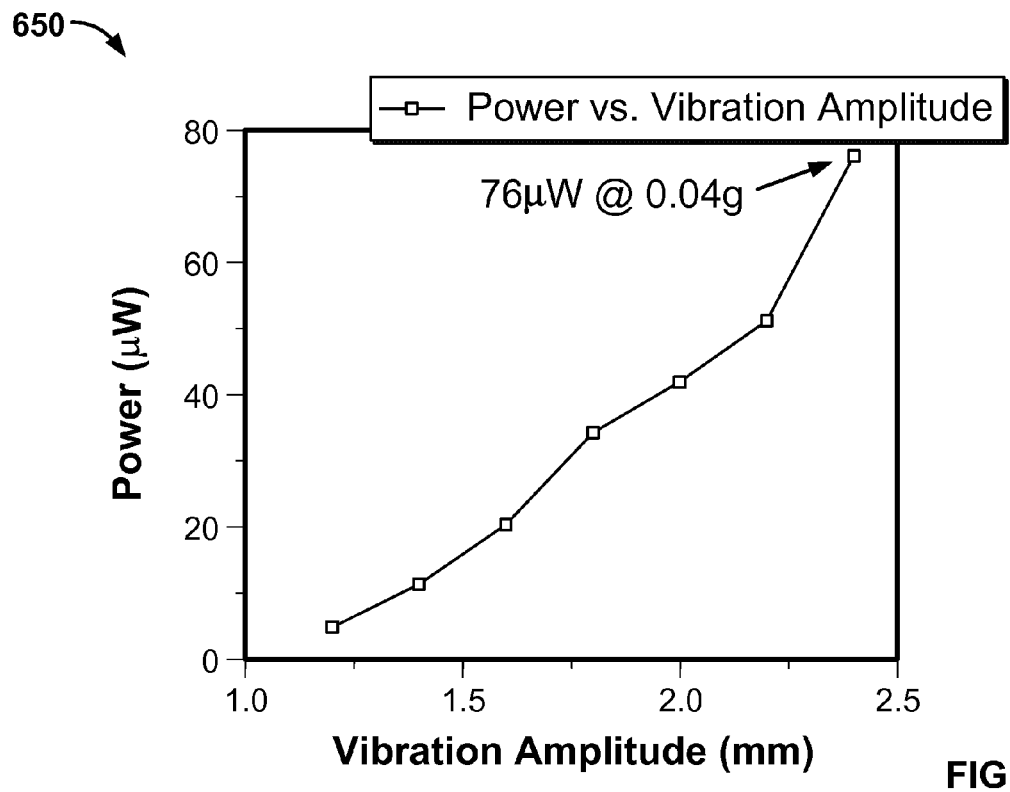
FIG. 6C shows a graph of measured power output (into 108Ω load) vs. vibration amplitude at 2 Hz for the energy harvester from FIG. 5B.
Figure 6D:
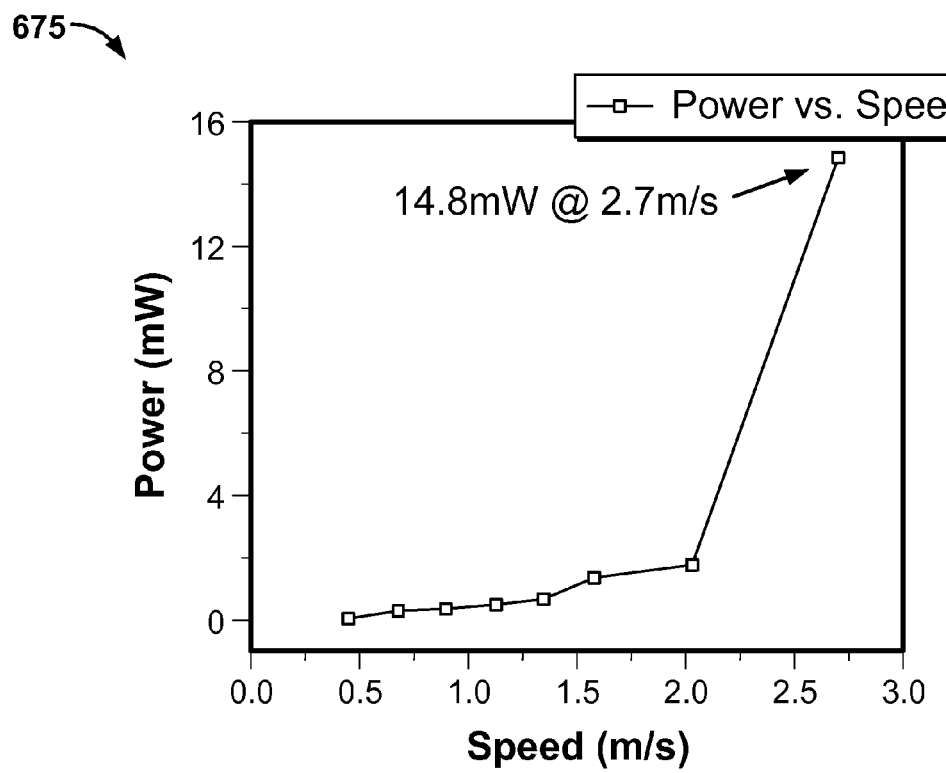
FIG. 6D shows a graph of measured power output (into 108Ω load) vs. walking speed of a human body carrying the energy harvester from FIG. 5B.

FIG. 6C shows a graph 650 of measured power output (into 108Ω load) vs. vibration amplitude at 2 Hz for the energy harvester from FIG. 5B. 2 Hz is a frequency lower than the harvester's resonant frequency by a factor of three, and the harvester produces 76 μW from 0.04 g acceleration (vibration amplitude of about 2.4 mm), as shown. These results show a great potential of the magnetic-spring-based harvester to harvest energy from low-frequency vibrations. FIG. 6D shows a graph 675 of measured power output (into 108Ω load) vs. walking speed of a human body carrying the energy harvester from FIG. 5B. When the energy harvester is placed in a backpack and measured at different walking speeds of the person carrying the backpack (from walking to slow-running), it generates significant power from human body motion, as shown in FIG. 6D. As the walking speed is increased from 0.45 m/s (slow walking) to 2.7 m/s (slow running), the power output is increased to 14.8 mW.

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the invention have been described. Other embodiments are within the scope of the following claims.

What is claimed is:

1. An apparatus to convert kinetic energy to electricity through electromagnetic transduction, the apparatus comprising:

an array of magnets arranged in a first plane; and
an array of coils arranged in a second plane with respect to the first plane to form a gap between the array of magnets and the array of coils;
wherein the array of magnets are arranged such that north and south poles of the magnets alternate and the magnets abut each other thereby creating a magnetic field distribution with steep field gradient.

2. The apparatus of claim 1, wherein each magnet in the array of magnets is 1-100 mm×1-100 mm×1-10 mm, each of the coils in the array of coils is 1-100 mm in diameter, and the gap is an air gap of 0.25 mm.

3. The apparatus of claim 1, wherein the array of magnets and the array of coils are configured and arranged to maximize magnetic flux change as either array moves relative to the other array in an in-plane direction in response to environmental vibration.

4. The apparatus of claim 1, wherein an amplitude of motion of either array in an in-plane direction relative to the other array is limited based on a size of the magnets as arranged in relation to the coils.

5. The apparatus of claim 4, wherein the size of the magnets as arranged in relation to the coils is selected based on expected motion in a target environment.

6. The apparatus of claim 5, wherein the size of each of the magnets in the vibration direction is a half of an expected maximum vibration amplitude.

7. The apparatus of claim 1, wherein an optimum amplitude of motion of either array in an in-plane direction relative to the other array is limited based on a size of the magnets as arranged in relation to the coils.

8. The apparatus of claim 1, comprising a mechanism to restrict motion transverse to the first and second planes and to limit motion in an in-plane direction within set boundaries.

9. The apparatus of claim 8, wherein the mechanism comprises a metal, silicon, silicon oxide, silicon nitride, hard plastic, or elastomer plate coupled with either the array of magnets or the array of coils to act as a cantilever for the attached array.

10. The apparatus of claim 9, wherein the mechanism comprises a silicone rubber plate.

11. A planar electromagnetic transducer to convert electrical energy to kinetic energy comprising:
an array of magnets arranged in a first plane; and
an array of coils arranged in a second plane with respect to the first plane to form a gap between the array of magnets and the array of coils;
wherein the array of magnets are arranged such that north and south poles of the magnets alternate and the magnets abut each other thereby creating a magnetic field distribution with steep field gradient.

12. The planar electromagnetic transducer of claim 11, wherein each magnet in the array of magnets is 1-100 mm×1-100 mm×1-10 mm, each of the coils in the array of coils is 1-100 mm in diameter, and the gap is an air gap of 0.25 mm.

13. The planar electromagnetic transducer of claim 11, wherein the array of magnets and the array of coils are configured and arranged to maximize magnetic flux change as either array moves relative to the other array in an in-plane direction.

14. The planar electromagnetic transducer of claim 11, wherein an amplitude of motion of either array in an in-plane direction relative to the other array is limited based on a size of the magnets as arranged in relation to the coils.

15. The planar electromagnetic transducer of claim 14, wherein the size of the magnets as arranged in relation to the coils is selected based on a target application.

16. The planar electromagnetic transducer of claim 11, comprising a mechanism to restrict motion transverse to the first and second planes and to limit motion in an in-plane direction within set boundaries.

17. The planar electromagnetic transducer of claim 16, wherein the mechanism comprises a metal, silicon, silicon oxide, silicon nitride, hard plastic, or elastomer plate coupled with either the array of magnets or the array of coils to act as a cantilever for the attached array.

18. The planar electromagnetic transducer of claim 17, wherein the mechanism comprises a silicone rubber plate.

* * * * *